June 21, 1927.
A. M. P. LUNDEGAARD
1,632,981
STEAM TURBINE GLAND WITH MORE THAN ONE PIPE CONNECTION
Filed Feb. 4, 1921
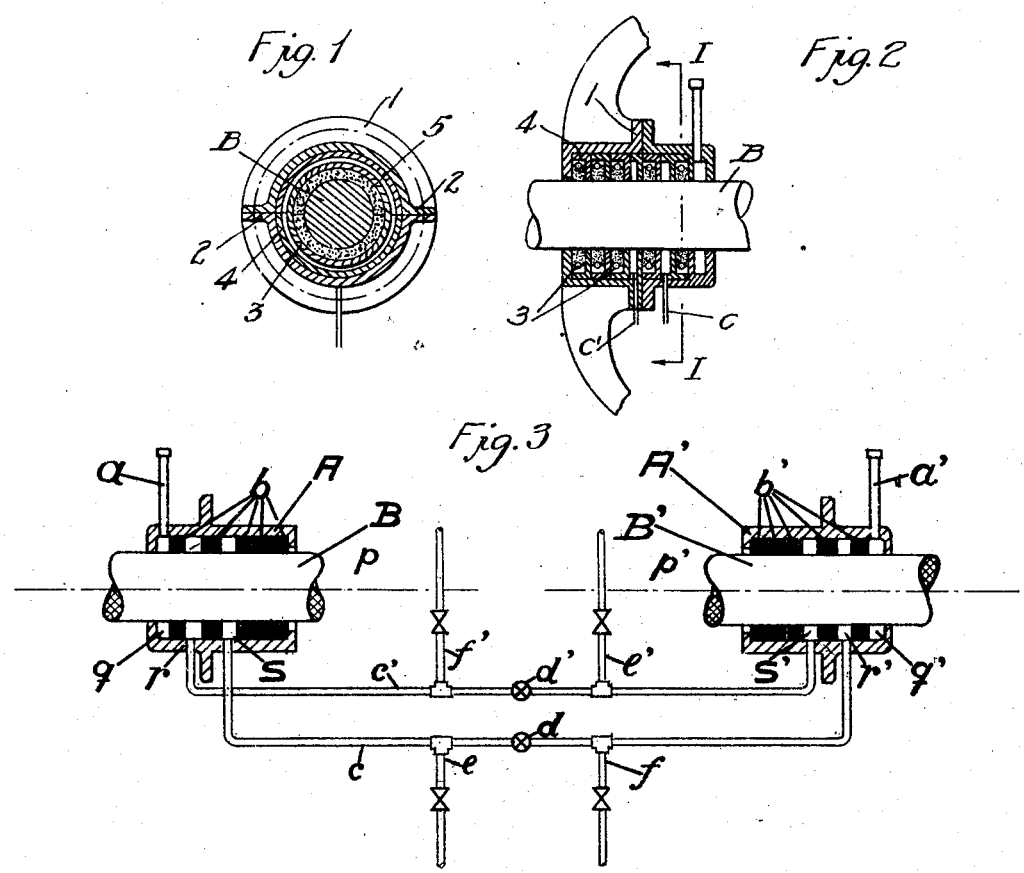

Patented June 21, 1927.

1,632,981

UNITED STATES PATENT OFFICE.

ANDERS MARIUS PEDERSEN LUNDEGAARD, OF COPENHAGEN, DENMARK.

STEAM-TURBINE GLAND WITH MORE THAN ONE PIPE CONNECTION.

Application filed February 4, 1921, Serial No. 442,482, and in Denmark February 4, 1920.

The present invention relates to the specific connections of steam turbine stuffing boxes, and its object is to provide a more effective packing of the shaft or shafts of turbines and especially of marine turbines which are adapted to be driven in either direction of rotation.

In the construction hitherto known the stuffing boxes are provided with one or more chambers into which either water, steam or exhaust steam is admitted by means of a pipe but only one such pipe is connected to its respective stuffing box. In the present invention an arrangement is set forth wherein two or more of the pipes are connected to one stuffing box or to other stuffing boxes whereby a more efficient packing is obtained when the turbine is driven in either direction of rotation by providing valves in the pipes. One of the advantages obtained by the present invention resides therein that in case of variation of the load on the turbine the pressures will vary, which necessitates an adjustment of the pressure in the chambers of the stuffing boxes and this adjustment is efficiently carried out by the arrangement of the pipe system.

Other objects will be apparent from the specification taken in connection with the accompanying drawing in which:

Figure 1 is a cross-sectional view of a stuffing box taken on line I—I of Fig. 2, Fig. 2 is an axial section of the stuffing box, and Fig. 3 represents a diagrammatic arrangement of the pipe connections for two stuffing boxes represented in section having a shaft in each box.

The two stuffing boxes A and A' are mounted on a single turbine shaft or on two different shafts B and B' whereby each stuffing box operates against steam having a pressure represented by $p$ and $p'$. Each box is provided with three chambers $q$, $r$ and $s$ and $q'$, $r'$ and $s'$ which are formed by the plurality of packing rings $b$ and $b'$ in said boxes. The arrangement of pipes for these stuffing boxes are as follows: From the steam chamber $q$ of box A a pipe $a$ leads to the atmosphere and similarly a pipe $a'$ leads from the chamber $q'$ of box A'. The outer chamber $r$ of box A communicates with the inner chamber $s'$ of box A' by a pipe $c'$ having a valve $d'$ therein and similarly outer chamber $r'$ of box A' communicates with inner chamber $s$ of box A by pipe $c$ having a valve $d$ therein.

With this arrangement the object is attained that an equal amount of steam shall escape from the pipes $a$ and $a'$ since when such condition is present an equally good tight and efficient connection is present at both stuffing boxes. If an equal pressure prevails in chambers $r$ and $r'$ and if this pressure is greater than atmospheric pressure an equal amount of steam will issue from pipes $a$ and $a'$, which thus produces an equal steam loss to the atmosphere and therefore equally good tightness of both stuffing boxes. The smaller this pressure the smaller the steam loss, and theoretically it appears that this pressure should be zero, that is atmospheric pressure in the chambers $r$ and $r'$ but practically a small over pressure will be maintained in order to make sure that no air will be sucked through pipes $a$ and $a'$ into the turbine or its condenser. In the following it will be shown how through suitable operation of the valves $d$ and $d'$ near atmospheric pressure can be maintained in chambers $r$ and $r'$.

Assuming that the pressure $p$ is greater than the pressure $p'$ or that pressure $p$ is greater than atmospheric pressure and $p'$ is below atmospheric pressure, then valve $d$ will be opened, which will allow steam to pass from chamber $s$ to chamber $r'$ through pipe $c$ and by suitably adjusting valve $d$ an equal amount of steam will escape from pipes $a$ and $a'$. It is thus possible by suitably adjusting either one or both valves $d$ and $d'$, which may be opened either simultaneously or one at a time according to the circumstances, to satisfactorily pack the boxes when necessary or when reversing the direction of the turbine or turbines. In case of too great overpressure or too great underpressure or both at $p$ or $p'$ there are provided two pipes $e$ and $f$ which lead from pipe $c$, pipe $e$ leading to a low pressure steam chamber and pipe $f$ leading to a high pressure steam chamber. Similarly low pressure pipe $e'$ and high pressure pipe $f'$ are connected to pipe $c'$. By suitable valves in these pipes steam can be led into pipes $c$ or $c'$ or steam can be exhausted therefrom, which has the effect of exhausting the steam from the required chambers of the stuffing boxes or allowing steam to enter depending upon the conditions of operation. Furthermore in the event of the valves $d$ and $d'$ becoming out of order the steam in the stuffing boxes may be adjusted or equalized by the valves in pipes, $f$, $f'$ $e$ and $e'$. To determine the exact pressure in pipes $c$ and $c'$ or in the stuffing boxes, pressure gauges (not shown) may be inserted so that an operator may tell at a glance the condition of the stuffing boxes and if necessary make adjustments of the valves.

Figs. 1 and 2 show that the stuffing box is divided along two planes indicated by flanges 1 and 2 which represent a vertical plane and a horizontal plane respectively. The portion of the box enclosed in the turbine casing is provided with a flange 1 at right angles to the axis while the portion outside the turbine casing is, in addition to such a flange, also provided with a horizontal flange 2. The spacing rings 4 are adapted to hold each packing ring on the shaft and the packing ring 5 which is preferably divided into two or more pieces is kept together by means of a spring 3.

I claim as my invention:

1. A pressure-regulating arrangement for the stuffing boxes of steam turbines comprising a plurality of packing rings in each stuffing box forming a plurality of chambers therein, one chamber of each box being in communication with the atmosphere; a pipe leading from an inner chamber of one box to an outer chamber of the other box; a second pipe leading from an outer chamber of the first-named stuffing box to an inner chamber of the second-named box; and means for equalizing and regulating the pressure in said chambers.

2. A pressure-regulating arrangement for the stuffing boxes of steam turbines comprising a plurality of packing rings in each stuffing box forming a plurality of chambers therein, one chamber of each box being in communication with the atmosphere; a pipe leading from an inner chamber of one box to an outer chamber of the other box; a second pipe leading from an outer chamber of the first-named stuffing box to an inner chamber of the second-named box; and means associated with said pipes for equalizing and regulating the pressure in said chambers.

3. A pressure-regulating arrangement for the stuffing boxes of steam turbines comprising a plurality of packing rings in each stuffing box forming a plurality of chambers therein, one chamber of each box being in communication with the atmosphere; a pipe leading from an inner chamber of one box to an outer chamber of the other box; a second pipe leading from an outer chamber of the first-named stuffing box to an inner chamber of the second-named box; and a valve in each pipe for equalizing and regulating the pressure in said chambers.

4. A pressure-regulating arrangement for the stuffing boxes of steam turbines comprising a plurality of packing rings in each stuffing box forming a plurality of chambers therein, one chamber of each box being in communicaion with the atmosphere; a pipe leading from an inner chamber of one box to an outer chamber of the other box; a second pipe leading from an outer chamber of the first-named stuffing box to an inner chamber of the second-named box; a valve in each pipe for equalizing and regulating the pressure in said chamber; and additional means associated with said pipes for equalizing and regulating the flow of steam into and out of said pipes.

M. LUNDEGAARD.